United States Patent
Kim et al.

(10) Patent No.: US 8,451,783 B2
(45) Date of Patent: May 28, 2013

(54) METHOD OF TRANSMITTING SCHEDULING REFERENCE SIGNAL

(75) Inventors: Hak Seong Kim, Seoul (KR); Young Woo Yun, Seoul (KR); Ki Jun Kim, Seoul (KR); Dae Won Lee, Seoul (KR); Suk Hyon Yoon, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 700 days.

(21) Appl. No.: 12/525,656

(22) PCT Filed: Feb. 4, 2008

(86) PCT No.: PCT/KR2008/000665
§ 371 (c)(1),
(2), (4) Date: Aug. 3, 2009

(87) PCT Pub. No.: WO2008/094022
PCT Pub. Date: Aug. 7, 2008

(65) Prior Publication Data
US 2010/0008333 A1    Jan. 14, 2010

Related U.S. Application Data

(60) Provisional application No. 60/888,056, filed on Feb. 2, 2007.

(30) Foreign Application Priority Data

Aug. 16, 2007    (KR) .......................... 10-2007-0082117

(51) Int. Cl.
*H04W 4/00*    (2009.01)
*H04B 7/208*   (2006.01)

(52) U.S. Cl.
USPC ............................................ 370/329; 370/344

(58) Field of Classification Search
USPC ......................................................... 370/329
See application file for complete search history.

(56) References Cited

U.S. PATENT DOCUMENTS

| 6,771,987 | B1  |   | 8/2004 | Dam et al. |
|-----------|-----|---|--------|-----------|
| 7,912,092 | B2  | * | 3/2011 | Kowalski ...................... 370/491 |
| 2005/0068931 | A1 | * | 3/2005 | Cho et al. ...................... 370/345 |
| 2005/0078651 | A1 |   | 4/2005 | Lee et al. |
| 2007/0004465 | A1 | * | 1/2007 | Papasakellariou et al. ... 455/571 |
| 2007/0098097 | A1 | * | 5/2007 | Khan et al. .................... 375/260 |
| 2008/0039098 | A1 | * | 2/2008 | Papasakellariou et al. ... 455/442 |
| 2008/0043708 | A1 | * | 2/2008 | Muharemovic et al. ...... 370/348 |

(Continued)

FOREIGN PATENT DOCUMENTS

JP    2004-248247 A    9/2004

*Primary Examiner* — Brandon Renner
*Assistant Examiner* — Shaq Taha
(74) *Attorney, Agent, or Firm* — Lee, Hong, Degerman, Kang & Waimey

(57) ABSTRACT

A method of transmitting a scheduling reference signal (SRS) for uplink scheduling is provided. The method includes transmitting a SRS on a first partial SRS transmission band in a first transmitting time, and transmitting the SRS on a second partial SRS transmission band in a second transmitting time, wherein the first and the second partial SRS transmission bands are parts of a full SRS transmission band and have exclusive positions with each other in the full SRS transmission band, the full SRS transmission band selected for uplink scheduling, the full SRS transmission band comprising a plurality of partial SRS transmission bands.

6 Claims, 8 Drawing Sheets

U.S. PATENT DOCUMENTS

| | | |
|---|---|---|
| 2009/0011711 A1* | 1/2009 | Kawasaki et al. ............... 455/62 |
| 2009/0268695 A1* | 10/2009 | Zhao et al. .................... 370/336 |
| 2010/0165894 A1* | 7/2010 | Furuskar et al. .............. 370/281 |
| 2010/0165930 A1* | 7/2010 | Zangi ............................ 370/329 |

* cited by examiner

METHOD OF TRANSMITTING SCHEDULING REFERENCE SIGNAL

CROSS-REFERENCE TO RELATED APPLICATIONS

This application is the National Stage filing under 35 U.S.C. §371 of International Application No. PCT/KR2008/000665, filed on Feb. 4, 2008, which claims the benefit of earlier filing date and right of priority to Korean Application No. 10-2007-0082117, filed on Aug. 16, 2007, and also claims the benefit of U.S. Provisional Application Ser. No. 60/888,056, filed on Feb. 2, 2007.

TECHNICAL FIELD

The present invention relates to radio communication, and more particularly, to a method of transmitting a scheduling reference signal, that is, a reference signal for uplink scheduling.

BACKGROUND ART

The next-generation mobile communication system must be able to transmit high quality and high capacity multimedia data at high speed using limited frequency resources. In order to enable it, inter-symbol interference and frequency selective fading, which occur at the time of high-speed transmission, must be overcome while maximizing frequency efficiency.

In order to improve the performance of the mobile communication system, a closed loop transmission scheme employing channel response information between a Base Station (BS) and a User Equipment (UE) has emerged. An Adaptive Modulation and Coding (AMC) scheme is the technology of increasing the link performance by controlling the modulation and coding method in a BS using feedback channel response information. Alternatively, the channel response information can be used for a BS to pre-process a channel so as to reduce a complex equalization process in a UE.

A method of obtaining downlink channel information is based on feedback information sent by a UE. The UE measures downlink channel response and constructs it as adequate feedback information. A BS that has received the feedback information performs downlink data scheduling using the feedback information. For example, the feedback information may have a quantization type of measured channel response.

In contrast, there are two types of reference signals transmitted over the uplink. One is a reference signal for estimating a channel in order to demodulate the uplink data, and the other is a reference signal for scheduling the frequency domain of the uplink by confirming the channel state of the uplink. The former is also called a data demodulation (DM) reference signal and the latter is also called a scheduling reference signal or a sounding signal. The DM reference signal is transmitted in a limited frequency domain only when there exists data transmitted over the uplink, whereas the scheduling reference signal is transmitted periodically over the entire frequency bands of the uplink irrespective of the existence of data.

The UE sends the scheduling reference signal through the uplink channel, and the BS confirms the channel state based on the scheduling reference signal and then performs scheduling for uplink transmission.

The scheduling reference signal transmitted over the downlink within one cell is broadcasted by the BS, whereas the scheduling reference signal transmitted over the uplink within one cell is transmitted from the entire UEs, existing in the cell, to the BS over the entire frequency bands. If a plurality of UEs transmits the scheduling reference signals over the entire frequency bands in a radio communication system with limited uplink frequency resources, interference occurs between the scheduling reference signals transmitted by the respective UEs. Thus, there is a need for a method of transmitting the scheduling reference signals efficiently.

DISCLOSURE OF INVENTION

Technical Problem

A method of transmitting and receiving scheduling reference signals is provided so as to guarantee orthogonality between scheduling reference signals of a plurality of UEs.

Technical Solution

In an aspect, a method of transmitting a scheduling reference signal (SRS) for uplink scheduling is provided. The method includes transmitting a SRS on a first partial SRS transmission band in a first transmitting time, and transmitting the SRS on a second partial SRS transmission band in a second transmitting time, wherein the first and the second partial SRS transmission bands are parts of a full SRS transmission band and have exclusive positions with each other in the full SRS transmission band, the full SRS transmission band selected for uplink scheduling, the full SRS transmission band comprising a plurality of partial SRS transmission bands.

In another aspect, a method of receiving a scheduling reference signal (SRS) for uplink scheduling is provided. The method includes allocating a transmission bandwidth to a user equipment, the transmission bandwidth being the bandwidth of a partial SRS transmission band, the partial SRS transmission band being a part of a full SRS transmission band, the full SRS transmission band for uplink scheduling comprising a plurality of partial SRS transmission bands, and receiving a SRS on the partial SRS transmission band.

ADVANTAGEOUS EFFECTS

Scheduling reference signals transmitted by a plurality of user equipments are multiplexed in frequency domain, time domain or code domain by keeping orthogonality between the scheduling reference signals. Interference between scheduling reference signals of respective user equipments can be reduced. A base station can obtain uplink channel information more accurately, thereby enabling efficient uplink scheduling.

BRIEF DESCRIPTION OF THE DRAWINGS

Further objects and advantages of the invention can be more fully understood from the following detailed description taken in conjunction with the accompanying drawings in which.

MODE FOR THE INVENTION

The present invention will now be described in detail in connection with specific embodiments with reference to the accompanying drawings.

Figure 1:
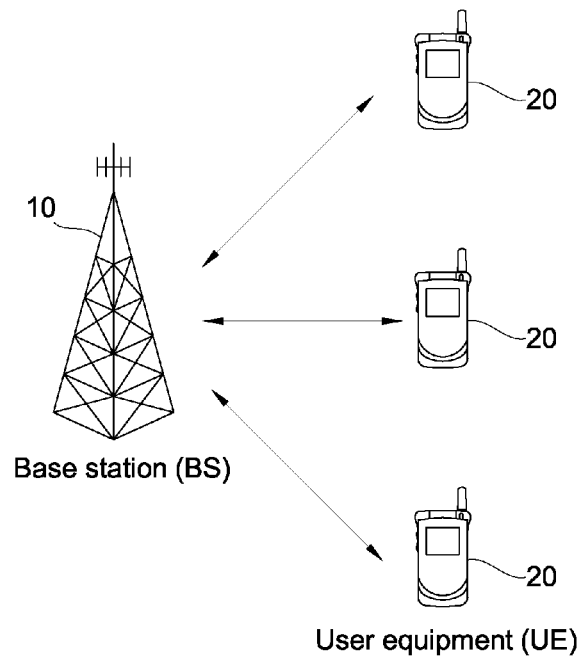
FIG. 1 is a block diagram of a radio communication system.

FIG. 1 is a block diagram of a radio communication system. The radio communication system is disposed over a wide area in order to provide various communication services such as voice and packet data.

Referring to FIG. 1, the radio communication system includes UEs 20 and a BS 10. The UE 20 may be fixed or have mobility and can also be called other terms such as a Mobile Station (MS), a User Terminal (UT), a Subscriber Station (SS) and a wireless device. The BS 10 generally refers to a fixed station communicating with the UE 20, and can also be called other terms such as Node-B, a Base Transceiver System (BTS) and an access point. One or more cells may exist in one BS 10

Hereinafter, the downlink refers to transmission from the BS 10 to the UE 20, and the uplink refers to transmission from the UE 20 to the BS 10. In the downlink, a transmitter can be part of the BS 10 and a receiver can be part of the UE 20. In the uplink, a transmitter can be part of the UE 20 and a receiver can be part of the BS 10

Figure 2:
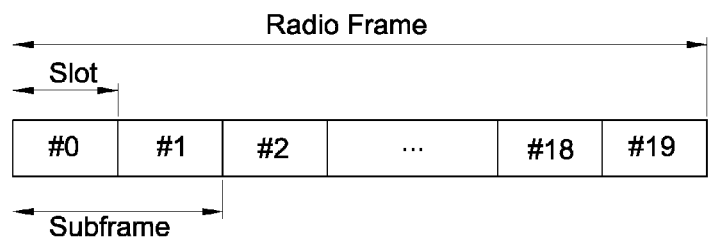
FIG. 2 illustrates an example of a radio frame format.

FIG. 2 illustrates an example of a radio frame format.

Referring to FIG. 2, the radio frame is comprised of ten subframes and one subframe may include two slots. One slot may include a plurality of OFDM symbols in the time domain and at least one subcarrier in the frequency domain. The slot may be referred to as a unit for allocating radio resources in the time domain and the frequency domain. For example, one slot may include seven or six OFDM symbols.

The format of the radio frame is only illustrative. The number of subframes included in the radio frame, the number of slots included in the subframe, or the number of OFDM symbols included in the slot may be changed in various ways.

Figure 3:
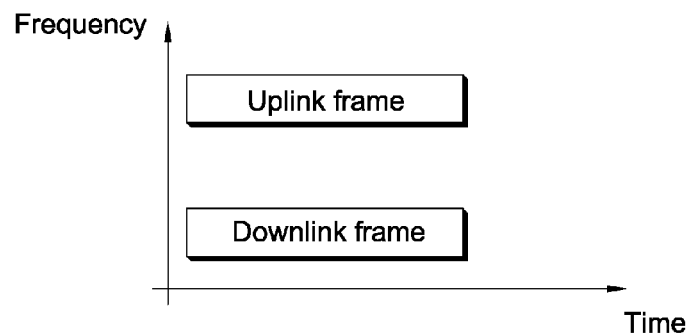
FIG. 3 illustrates the frame format of a Frequency Division Duplex (FDD) system.

FIG. 3 illustrates the frame format of a FDD system.

Referring to FIG. 3, the frame includes a downlink frame and an uplink frame. The downlink frame and the uplink frame can be transmitted at the same time, but occupy different frequency bands. The arrangement of the uplink frame and the uplink frame is only illustrative, and the position in the frequency domain of the downlink frame and the uplink frame can be changed. A relative length between the uplink frame and the uplink frame can also be changed.

Figure 4:
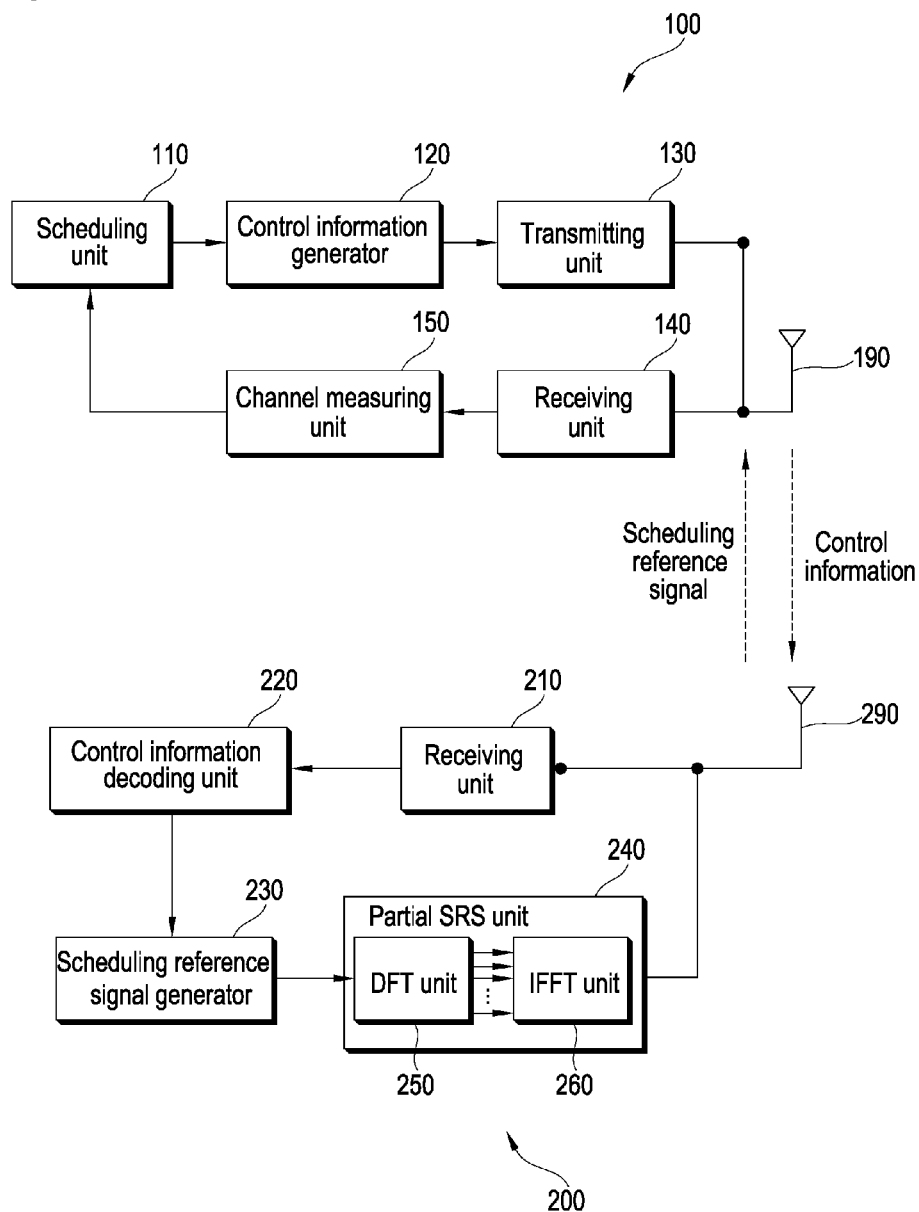
FIG. 4 is a block diagram showing a transmitter and a receiver according to an embodiment of the present invention.

FIG. 4 is a block diagram showing a transmitter and a receiver according to an embodiment of the present invention. The receiver refers to an apparatus for receiving scheduling reference signals and the transmitter refers to an apparatus for transmitting scheduling reference signals. In uplink transmission, the receiver may be part of a BS and the transmitter may be part of a UE.

Referring to FIG. 4, a receiver 100 includes a scheduling unit 110, a control information generator 120, a transmitting unit 130, a receiving unit 140 and a channel measuring unit 150. The scheduling unit 110 allocates a transmission bandwidth of a scheduling reference signal transmitted by a transmitter 200.

The scheduling reference signal (SRS) is a reference signal transmitted over the uplink for the purpose of uplink scheduling and is also called a sounding reference signal.

The transmission bandwidth is a basic bandwidth for deciding over how much bandwidth to send the scheduling reference signal in every transmitting time. Thus, if the transmission bandwidth is given, the transmitter 200 can divide uplink frequency band by the transmission bandwidth and transmit scheduling reference signal. Uplink frequency band is divided into a plurality of frequency domains by the transmission bandwidth. Each of the frequency domains as described above is called a partial SRS transmission band. The size of partial SRS transmission band is given in terms of resource block (RB), such as 2RB, 4RB, 6RB, and so on. The transmission bandwidth and the partial SRS transmission band are described later on with reference to FIG. 5.

The scheduling unit 110 allocates a transmission bandwidth to the transmitter 200. The transmission bandwidth can be allocated differently in size to each transmitter 200. That is, the transmission bandwidth of 5 MHz may be allocated to one transmitter and the transmission bandwidth of 10 MHz may be allocated to the other transmitter.

The control information generator 120 generates control information for a scheduling reference signal, including a transmission bandwidth, a frequency hopping method, an orthogonal code allocation method and/or its pertinent parameters. The transmitting unit 130 transmits the control information to the transmitter 200 through an antenna 190.

The receiving unit 140 receives the scheduling reference signal, transmitted through the allocated partial SRS transmission band, from the transmitter 200. The channel measuring unit 150 measures a channel state using the received scheduling reference signal. The scheduling unit 110 decides radio resource allocation necessary for data transfer based on the channel information measured by the channel measuring unit 150.

The transmitter 200 includes a receiving unit 210, a control information decoding unit 220, a scheduling reference signal generator 230 and a transmitting unit 240. The receiving unit 210 receives control information through an antenna 290. The control information decoding unit 220 decodes the control information and obtains a transmission bandwidth and/or its pertinent parameters. The scheduling reference signal generator 230 generates a preset scheduling reference signal and allocates it to each subcarrier within a partial SRS transmission band.

The transmitting unit 240 transmits the scheduling reference signal through the partial SRS transmission band. The transmitting unit 240 includes a Discrete Fourier Transform (DFT) unit 250 that performs DFT and an IFFT (Inverse Fast Fourier Transform) unit 260 that performs IFFT. The DFT unit 250 performs DFT on input data and outputs a frequency domain symbol. The IFFT unit 260 performs IFFT on the input frequency domain symbol and outputs a transmit (Tx) signal. The Tx signal becomes a time domain signal. The time domain symbol output through the IFFT unit 260 is referred to as an Orthogonal Frequency Division Multiplexing (OFDM) symbol or a Single Carrier-Frequency Division Multiple Access (SC-FDMA) symbol. A method of spreading a symbol by performing DFT at the front end of the IFFT unit 120 is called SC-FDMA. This method is advantageous in lowering the Peak-to-Average Power Ratio (PAPR) when compared with OFDM.

Transmission of the SC-FDMA method has been described. However, a multi-access scheme to which the present invention is applied is not limited. For example, a variety of multi-access schemes, such as Code Division Multiple Access (CDMA), Time Division Multiple Access (TDMA), Frequency Division Multiple Access (FDMA), SC-FDMA and OFDMA, may be used. In a radio communication system, the multi-access schemes of the uplink and the downlink may differ. For example, the uplink may use SC-FDMA and the downlink may use OFDMA.

Figure 5:
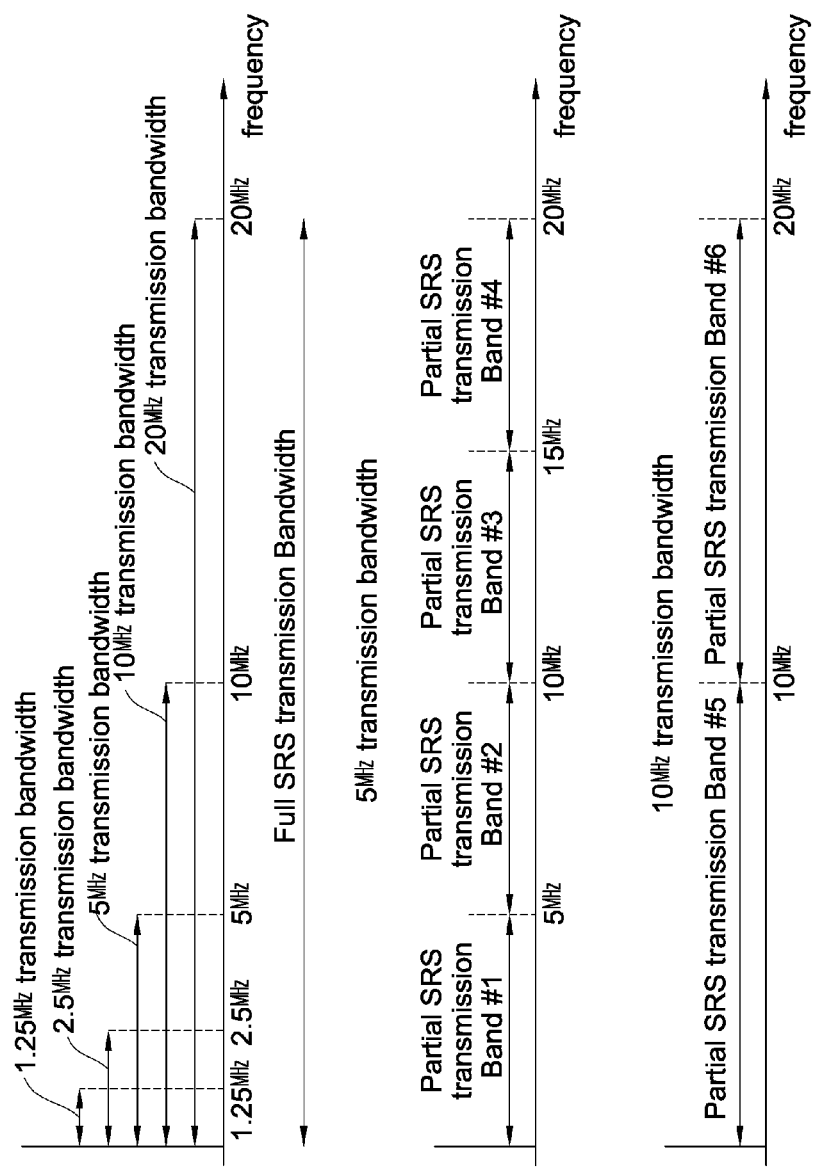
FIG. 5 is a view illustrating transmission bandwidths and partial SRS transmission bands set to have bandwidths of various sizes.

FIG. 5 is a view illustrating transmission bandwidths and partial SRS transmission bands set to have bandwidths of various sizes. It is assumed that a full SRS transmission band given hereinafter is 20 MHz. The full SRS transmission band is selected for uplink scheduling which is divided into a plurality of partial SRS transmission bands.

Referring to FIG. 5, five kinds of transmission bandwidths are illustrated. The five kinds of transmission bandwidths are 1.25 MHz transmission bandwidth, 2.5 MHz transmission bandwidth, 5 MHz transmission bandwidth, 10 MHz transmission bandwidth, and 20 MHz transmission bandwidth. If the scheduling unit 110 has allocated the 5 MHz transmission bandwidth to the transmitter 200, the transmitter 200 divides the full SRS transmission band of 20 MHz into four every 5 MHz and transmits scheduling reference signals through the divided partial SRS transmission bands #1 to #4, respectively. In a similar way, if the scheduling unit 110 has allocated the 10 MHz transmission bandwidth to the transmitter 200, the transmitter 200 divides the uplink frequency band of 20 MHz into two equal parts and transmits scheduling reference signals through the divided partial SRS transmission bands #5 and #6, respectively.

Figure 6:
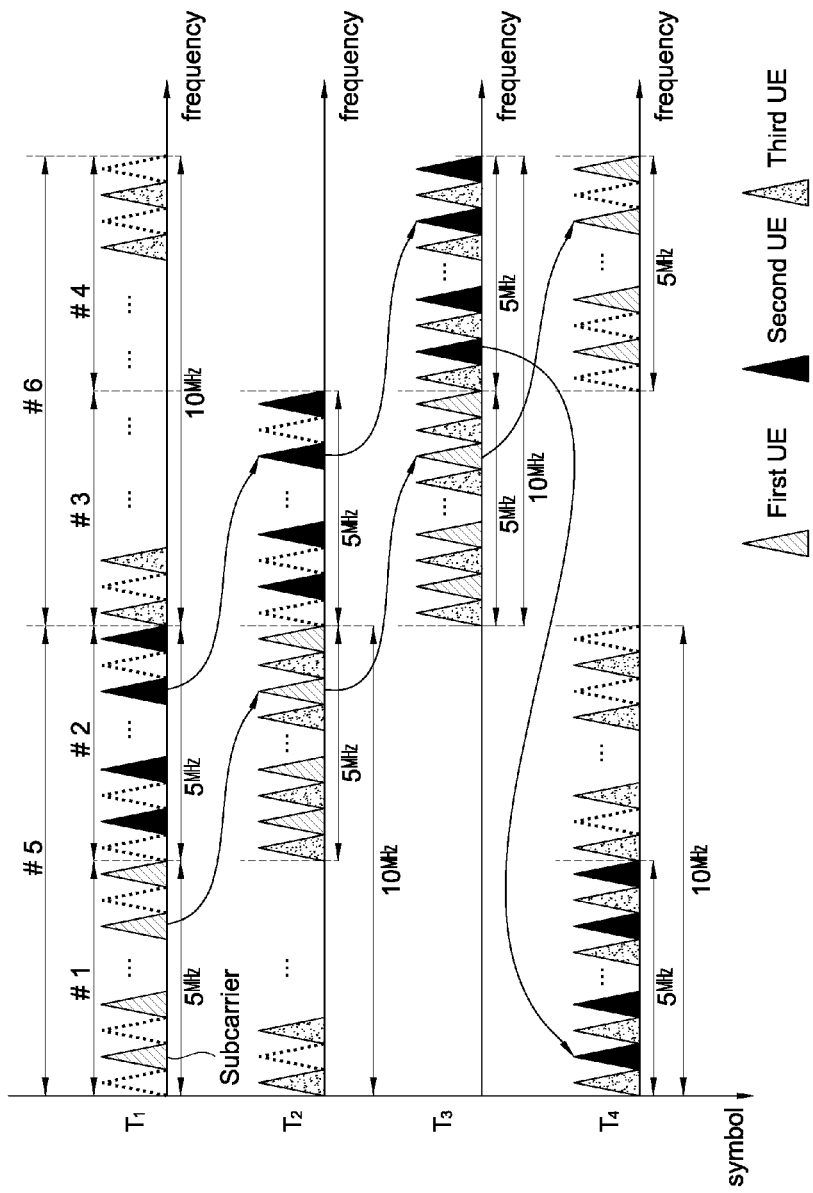
FIG. 6 shows an example of a multiplexing method of a scheduling reference signal when the distance of subcarriers is 2 according to the present invention.

FIG. 6 shows an example of a multiplexing method of a scheduling reference signal when the distance of subcarriers is 2. It is assumed that an full SRS transmission band given hereinafter is 20 MHz.

Referring to FIG. 6, scheduling reference signals of two UEs (a first and a second UEs) to which the 5 MHz transmission bandwidth has been allocated and one UE (a third UE) to which the 10 MHz transmission bandwidth has been allocated are multiplexed in the frequency domain. In other words, the full SRS transmission band is divided into four partial SRS transmission bands #1 to #4 by the 5 MHz transmission bandwidth and divided into two partial SRS transmission bands #5 and #6 by the 10 MHz transmission bandwidth. In order for the first and second UEs to transmit the scheduling reference signals with respect to the full SRS transmission band, the first and second UEs must experience four transmitting times. In order for the third UE to transmit the scheduling reference signals with respect to the entire full SRS transmission band, the third UE must experience two transmitting times.

The term subcarrier interval refers to a subcarrier interval allocated to a UE so as to transmit the scheduling reference signal. The term transmitting time (T) refers to a temporal distance at which a UE transmits the scheduling reference signal. When the subcarrier interval is 2, respective UEs are allocated with subcarriers in different exclusive positions on the full SRS transmission band. For example, the first and second UEs can transmit the scheduling reference signals through subcarriers having even-numbered indices in the respective partial SRS transmission bands every transmitting time, and the third UE can transmit the scheduling reference signal through a subcarrier having an odd-numbered index in the partial SRS transmission band every transmitting time.

At $T_1$, the first UE transmits the scheduling reference signal using a subcarrier having an even-numbered index through the partial SRS transmission band #1, the second UE transmits the scheduling reference signal using a subcarrier having an even-numbered index through the partial SRS transmission band #2, and the third UE transmits the scheduling reference signal using a subcarrier having an odd-numbered index through the partial SRS transmission band #6.

At $T_2$, the first UE transmits the scheduling reference signal using a subcarrier having an even-numbered index through the partial SRS transmission band #2, the second UE transmits the scheduling reference signal using a subcarrier having an even-numbered index through the partial SRS transmission band #3, and the third UE transmits the scheduling reference signal using a subcarrier having an odd-numbered index through the partial SRS transmission band #5.

At $T_3$, the first UE transmits the scheduling reference signal using a subcarrier having an even-numbered index through the partial SRS transmission band #3, the second UE transmits the scheduling reference signal using a subcarrier having an even-numbered index through the partial SRS transmission band #4, and the third UE transmits the scheduling reference signal using a subcarrier having an odd-numbered index through the partial SRS transmission band #6.

At $T_4$, the first UE transmits the scheduling reference signal using a subcarrier having an even-numbered index through the partial SRS transmission band #4, the second UE transmits the scheduling reference signal using a subcarrier having an even-numbered index through the partial SRS transmission band #1, and the third UE transmits the scheduling reference signal using a subcarrier having an odd-numbered index through the partial SRS transmission band #5.

In this manner, each UE transmits the scheduling reference signal using a subcarrier allocated thereto while hopping each partial SRS transmission band at an allocated transmission bandwidth every transmitting time and span (cover) all the full SRS transmission band. Even in the case of UEs with different transmission bandwidths, even though the scheduling reference signals are transmitted at the same time from overlapping partial SRS transmission band, orthogonality can be maintained since the subcarrier intervals differ.

Figure 7:
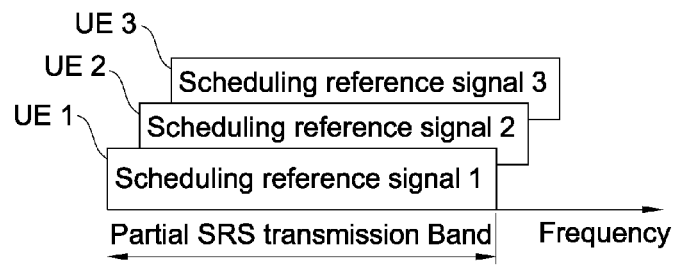
FIG. 7 shows another example of a multiplexing method of a scheduling reference signal according to the present invention.

FIG. 7 shows another example of a multiplexing method of a scheduling reference signal.

Referring to FIG. 7, scheduling reference signals of different UEs to which the same transmission bandwidth has been allocated even employ the entire subcarriers within one partial SRS transmission band. The scheduling reference signals of different UEs undergo a Code Division Multiplexing (hereinafter, referred to as CDM) and are thus orthogonal to one another. That is, the scheduling reference signals of different UEs maintain orthogonality in the code domain. A BS can determine which scheduling reference signal corresponds to which UE from multiplexed scheduling reference signals based on a correlation characteristic of the orthogonal scheduling reference signals. This is called CDM.

In order to multiplex the scheduling reference signals, an orthogonal symbol, such as a Constant Amplitude Zero Auto-Correlation (CAZAC) sequence or a Walsh code, can be used.

Assuming that N is the length of the CAZAC sequence having a positive integer and an index M is a prime relatively to the N in Zadoff-Chu CAZAC, a $k^{th}$ entry of a $M^{th}$ CAZAC sequence can be expressed in the following Mathematical Formula 1.

$$c(k; N, M) = \exp\left\{\frac{j\pi Mk(k+1)}{N}\right\}$$ [Mathematical Formula 1]

where N is an odd number.

$$c\{k; N, M) = \exp\left\{\frac{j\pi Mk^2}{N}\right\}$$

where N is an even number.

The CAZAC sequence c (k; M, N) has the following three characteristics.

$$|c(k; N, M)| = 1 \text{ for all } k, N, M$$ [Mathematical Formula 2]

$$R_{M;N}(d) = \begin{cases} 1, & \text{for } d = 0 \\ 0, & \text{for } d \neq 0 \end{cases}$$ [Mathematical Formula 3]

$$R_{M_1, M_2;N}(d) = p \text{ for all } M_1, M_2$$ [Mathematical Formula 4]

Mathematical Formula 2 is meant that the CAZAC sequence has always the amount of 1, and Mathematical Formula 3 is meant that auto correlation of the CAZAC sequence is expressed by the Dirac delta function. In the above, mutual correlation is based on circular correlation and the lengths of cyclic-shifted CAZAC sequences are identical. Mathematical Formula 4 is meant that cross correlation is always constant. The CAZAC sequences are orthogonal to each other when they are cyclic shifted or have different indices.

When the CAZAC sequence is used as the scheduling reference signal, the orthogonality of the scheduling reference signal can be obtained by cyclic-shifting different UEs and setting indices to different cells.

Figure 8:
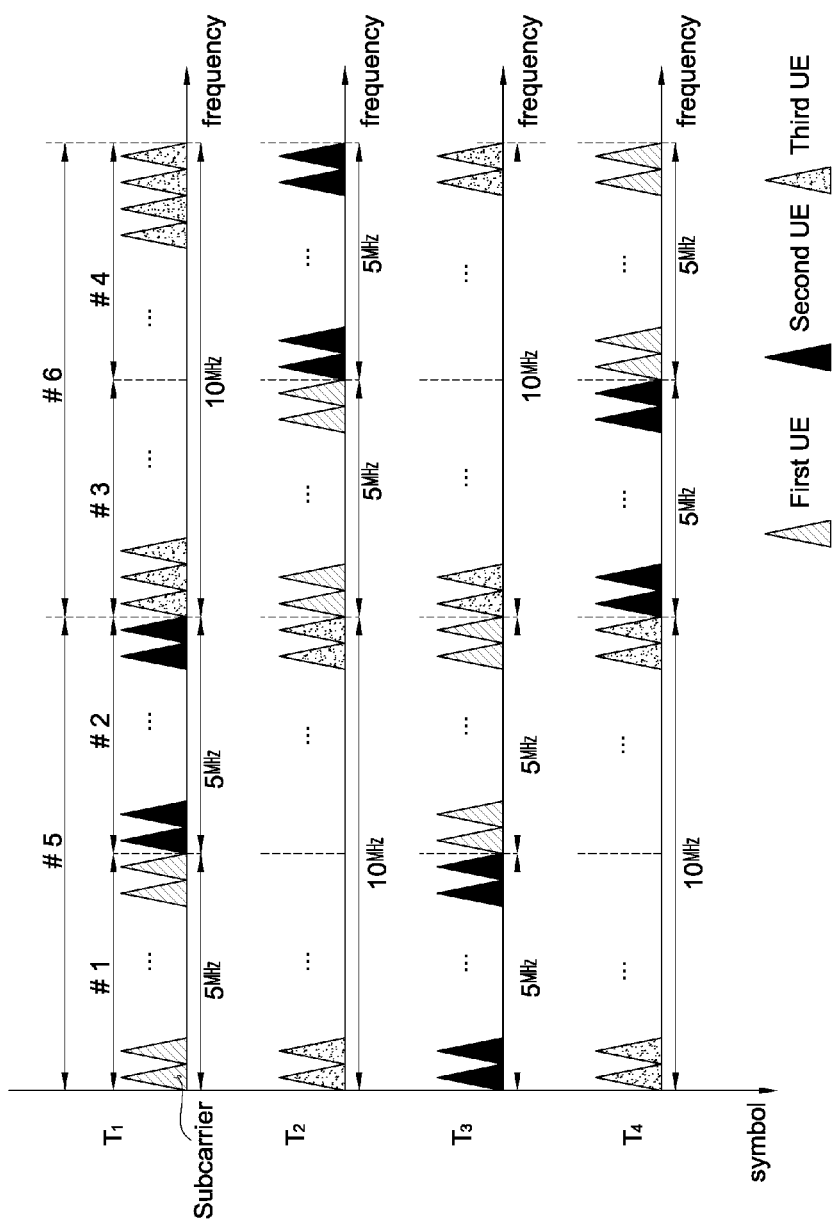
FIG. 8 shows an example of a multiplexing method of a scheduling reference signal when the distance of subcarriers is 1 according to the present invention.

FIG. 8 shows an example of a multiplexing method of a scheduling reference signal when the distance of subcarriers is 1. It is assumed that an full SRS transmission band given hereinafter is 20 MHz.

Referring to FIG. 8, the full SRS transmission band is divided into four partial SRS transmission bands #1 to #4 by a 5 MHz transmission bandwidth and into two partial SRS transmission bands #5 and #6 by a 10 MHz transmission bandwidth. In order for a first and a second UEs to which the 5 MHz transmission bandwidth has been allocated to transmit scheduling reference signals with respect to the entire full SRS transmission band, the first and second UEs must experience four transmitting times. In order for a third UE to which the 10 MHz transmission bandwidth has been allocated to transmit a scheduling reference signal with respect to the entire full SRS transmission band, the third UE must experience two transmitting times.

At this time, the UEs transmit the scheduling reference signals by employing the entire subcarriers of the partial SRS transmission bands given thereto unlike when the subcarrier interval is 2 since the subcarrier interval is 1. Thus, the scheduling reference signals must be transmitted after performing scheduling so that the partial SRS transmission bands are not overlapped in UEs with different transmission bandwidths.

The first UE transmits the scheduling reference signal through the partial SRS transmission band #1 in $T_1$, through the partial SRS transmission band #3 in $T_2$, through the partial SRS transmission band #2 in $T_3$, and through the partial SRS transmission band #4 in $T_4$.

The second UE transmits the scheduling reference signal through the partial SRS transmission band #2 in $T_1$, through the partial SRS transmission band #4 in $T_2$, through the partial SRS transmission band #1 in $T_3$, and through the partial SRS transmission band #3 in $T_4$.

The third UE transmits the scheduling reference signal through the partial SRS transmission band #6 in $T_1$, through the partial SRS transmission band #5 in $T_2$, through the partial SRS transmission band #6 in $T_3$, and through the partial SRS transmission band #5 in $T_4$.

A method of hopping the partial SRS transmission bands may be changed in various ways in addition to the above method. By transmitting the scheduling reference signals every transmission bandwidth while hopping the frequency domains as described above, the scheduling reference signals of the respective UEs can maintain the orthogonality of the frequency domains.

Of course, the first UE and the second UE may transmit the scheduling reference signals while maintaining the orthogonality in the code domain and hopping the same partial SRS transmission band, as in FIG. 7, since they have the same transmission bandwidth.

Figure 9:
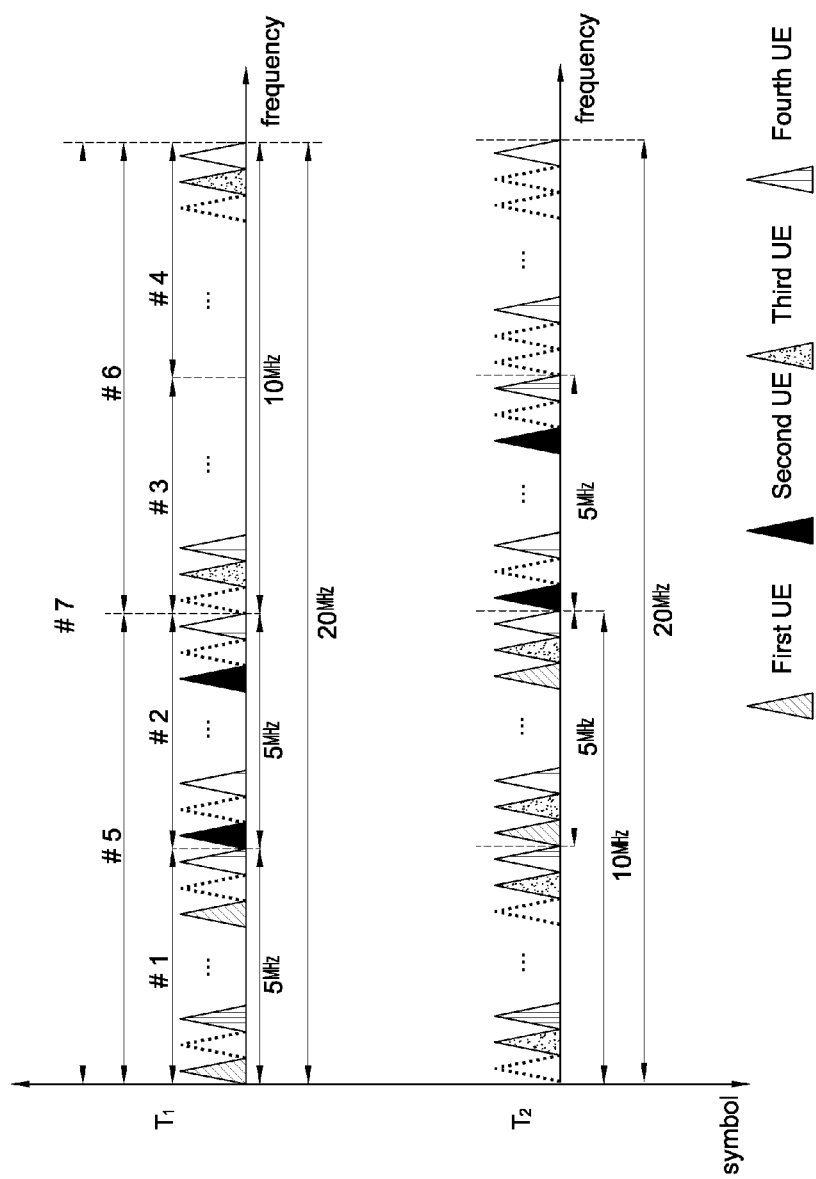
FIG. 9 shows an example of a multiplexing method of a scheduling reference signal when the distance of subcarriers is 3 according to the present invention.

FIG. 9 shows an example of a multiplexing method of a scheduling reference signal when the distance of subcarriers is 3. It is assumed that an full SRS transmission band given hereinafter is 20 MHz.

Referring to FIG. 9, the types of transmission bandwidths are 5 MHz, 10 MHz and 20 MHz, and the subcarrier interval is 3. A UE to which the 5 MHz transmission bandwidth has been allocated transmits the scheduling reference signal through 1, 4, 7, 10, . . . , $(3k-2)^{th}$ subcarriers in the entire frequency bands. A UE to which the 10 MHz transmission bandwidth has been allocated transmits the scheduling reference signal through 2, 5, 8, 11, . . . , $(3k-1)^{th}$ subcarriers in the entire frequency bands. A UE to which the 20 MHz transmission bandwidth has been allocated transmits the scheduling reference signal through 3, 6, 9, 12, . . . , $(3k)^{th}$ subcarriers in the entire frequency bands. In other words, each UE transmits the scheduling reference signal through one subcarrier every three subcarriers in each partial SRS transmission band. Since the type of the allocated transmission bandwidth is 3 and the subcarrier interval is 3, orthogonality can be maintained even though UEs to which different transmission bandwidths are allocated transmit the scheduling reference signals through overlapped partial SRS transmission bands.

The UE having the 5 MHz transmission bandwidth divides the entire frequency bands into four partial SRS transmission bands #1 to #4, hops each partial SRS transmission band during 4 transmitting times, and transmits the scheduling reference signal. The UE having the 10 MHz transmission bandwidth divides the entire frequency bands into two partial SRS transmission bands #5 and #6, hops each partial SRS transmission band during 2 transmitting time, and transmits the scheduling reference signal. The UE having the 20 MHz transmission bandwidth transmits the scheduling reference signal of a partial SRS transmission band #7 every transmitting time since the entire frequency bands are one partial SRS transmission band #7.

As in FIG. 7, the first UE and the second UE may transmit the scheduling reference signals while maintaining the orthogonality in the code domain and hopping the same partial SRS transmission band, since they have the same transmission bandwidth.

In order to further secure the orthogonal domain in FDM, a greater subcarrier interval value can be used. Further, in order to further secure the orthogonal domain in the code division region, an orthogonal code generating method capable of generating a larger number of orthogonal codes can be used.

Table 1 lists the number of orthogonal codes, which can be generated in the entire full SRS transmission bands according to transmission bandwidths and a subcarrier interval, in the case where the CAZAC sequence is used when the length of a SC-FDMA (or OFDMA) symbol is approximately 60 to 70 μs and a Cyclic Prefix (CP) length is about 5 μs.

TABLE 1

| subcarrier interval | 1.25 MHz | 2.5 MHz | 5 MHz | 10 MHz | 20 MHz |
|---|---|---|---|---|---|
| 1 | 192 | 96 | 48 | 24 | 12 |
| 2 | 96 | 48 | 24 | 12 | 6 |
| 3 | 64 | 32 | 16 | 8 | 4 |
| 4 | 48 | 24 | 12 | 6 | 3 |

CP formats in SC-FDMA (or OFDMA) include a normal CP and an extended CP. When the normal CP is used, only the CP of the first one of seven symbols within one slot has 160 samples and the CPs of the remaining six symbols have 144 samples. When the extended CP is used, the CPs of the entire six symbols have 512 samples. Thus, in the case of the normal CP, the number of samples of one SC-FDMA symbol, including the CPs, is 2208 (the first symbol) or 2192 (symbols other than the first symbol).

In the case of the normal CP, the number of samples included in one slot is samples/slot=(160+2048)×1+(144+2048)×6=15,360. Further, one sampling time is 1/(15000×2048)=3.26×0$^{-8}$ sec. The number of shifted sequences, which can be obtained when the CAZAC sequence is used in this structure, is as follows.

(1) When Only the 20 MHz Transmission Bandwidth is Used

When the subcarrier interval is 1, the CAZAC sequence value is loaded every subcarrier. Accordingly, there is no significant change in the time domain after IFFT is performed. That is, one (SC-FDMA or OFDMA) symbol is obtained. One symbol has 2048 samples except for the CP.

If it is required for a shifted CAZAC sequence to maintain a correlation characteristic without change, the amount of shift must be at least greater than the number of CP samples. This is because the amount of the CP is decided by reflecting the delay spreading value of a channel that experiences frequency selective fading. Thus, it can be seen that the CAZAC sequence must shift at least greater than the CP length in order to guarantee orthogonality in this channel.

Since the number of CP samples is 144 or 160, one CAZAC sequence that is properly shifted can be obtained when the CAZAC sequence is shifted as many as the number of at least 160 samples when the number of CP samples of 160 is based. When one SC-FDMA (or OFDMA) symbol is 2048 samples, at least 12 shifted CAZAC sequence can be obtained since 2048/160=12.8. Accordingly, when the subcarrier interval is 1 in Table 1, the number of shifted CAZAC sequences that can be obtained in the 20 MHz transmission bandwidth is 12.

If the subcarrier interval becomes 2, an output value has a structure in which a specific value is repeated since the input is performed every other one in terms of the IFFT characteristic. Thus, a structure having an original 2048 sample length becomes a structure in which two 1024 sample lengths are repeated. In this case, the shifted CAZAC sequences that can be obtained are reduced in half. That is, since 1024/160=6.4, only six shifted CAZAC sequences can be obtained.

When the subcarrier interval is 3, the value is input one by one every three subcarriers. Thus, the output value has a structure in which three values are repeated and the shifted CAZAC sequences are reduced by ⅓.

(2) When the 10 MHz Transmission Bandwidth is Used

When a UE transmits the scheduling reference signal, the full SRS transmission band of 20 MHz is divided into two partial SRS transmission bands every 10 MHz and the two divided partial SRS transmission bands can be used independently.

If the subcarrier interval is 1, the number of the shifted CAZAC sequences that can be obtained in one independent 10 MHz partial SRS transmission band is 1024 samples (one symbol)/80 samples (one CP)=12.8, resulting 12 in total. When samples are transmitted at 10 MHz, the number of samples per symbol is reduced, but the time length of one symbol is the same. Consequently, the distance between the samples is doubled. In other words, the sample distance in 20 MHz is different from that in 10 MHz. Accordingly, in the length of the CP, if only 80 samples are caught, 160 sample lengths in 20 MHz are the same. Since 12 shift sequences can be generated in each partial SRS transmission band, a total of 24 shift sequences can be obtained in the entire frequency band.

When the subcarrier interval is 2, 512 samples have a repeated structure as mentioned earlier, leading to 512/80=6.4 and 6 CAZAC sequences. Accordingly, the number of the shifted CAZAC sequences is reduced in half.

(3) When the 5 MHz Transmission Bandwidth is Used

The frequency band of 20 MHz is divided into four independent 5 MHz bands. Since 12×4=48, 48 shifted CAZAC sequences can be obtained.

As described above, if the entire frequency band are divided into small transmission bandwidths to be used rather than to be used as one transmission bandwidth, the number of UEs (a total number of the shifted CAZAC sequences), which can transmit the scheduling reference signals at the same time, is increased significantly.

Figure 10:
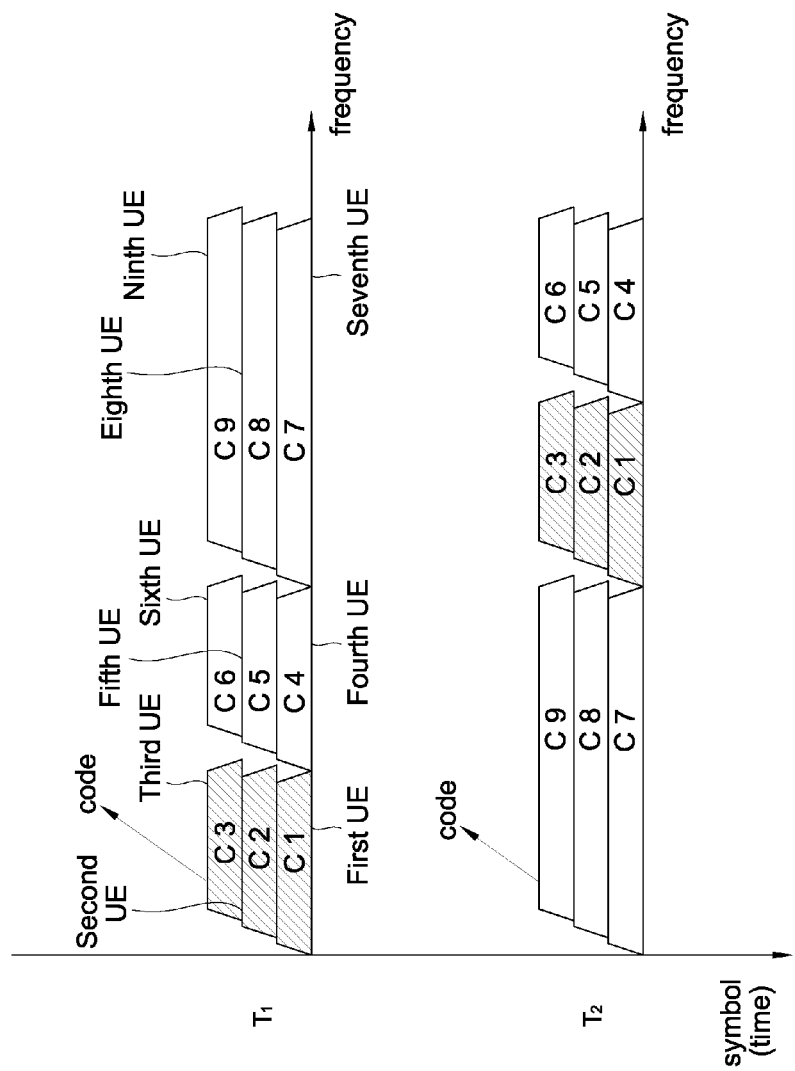
FIG. 10 shows still another example of a multiplexing method of a scheduling reference signal according to the present invention.

FIG. 10 shows still another example of a multiplexing method of a scheduling reference signal.

Referring to FIG. 10, the subcarrier interval is 1 and the scheduling reference signals are multiplexed with FDM and CDM being combined together. That is, a first to a third UEs transmit the scheduling reference signals using different codes C1 to C3 in the same partial SRS transmission band. A fourth to a sixth UEs also transmit the scheduling reference signals using different codes C4 to C6 in the same partial SRS transmission band. A seventh to a ninth UEs also transmit the scheduling reference signals using different codes C7 to C9 in the same partial SRS transmission band. Since FDM and CDM are combined, the capacity of the UE that can transmit the scheduling reference signal within one cell can be increased.

Figure 11:
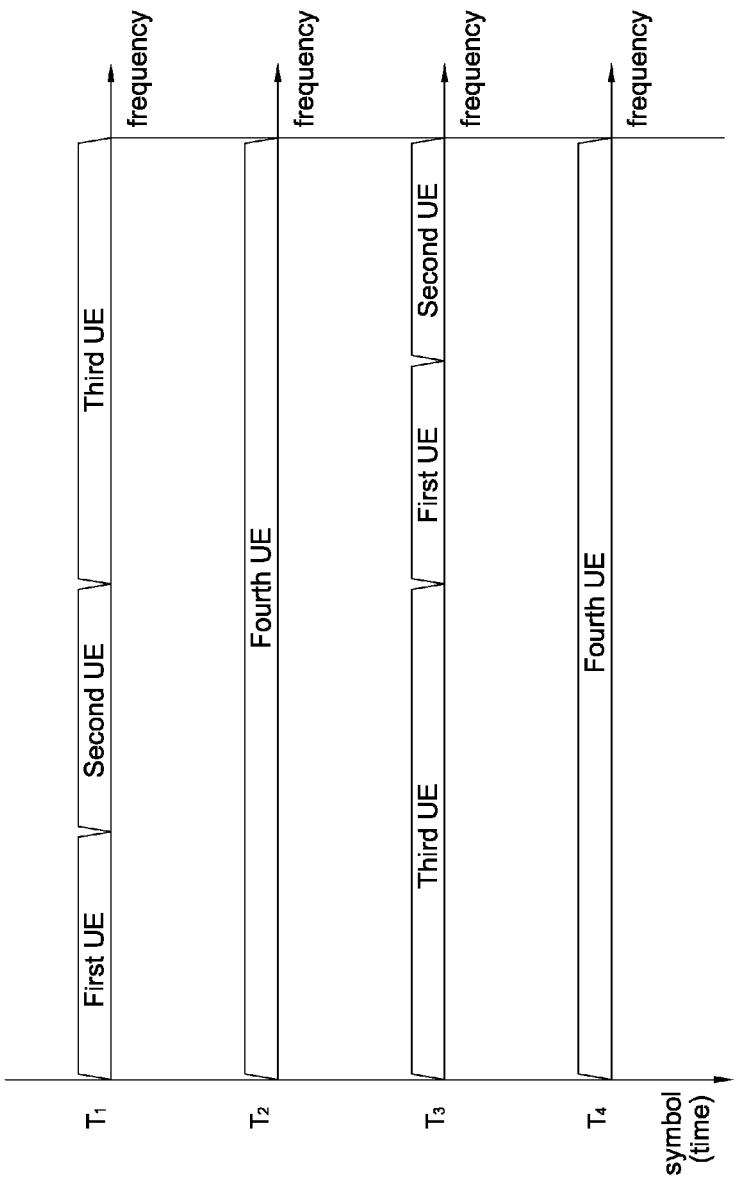
FIG. 11 shows further still another example of a multiplexing method of a scheduling reference signal according to the present invention.

FIG. 11 shows further still another example of a multiplexing method of a scheduling reference signal. It is assumed that an full SRS transmission band given hereinafter is 20 MHz.

Referring to FIG. 11, the subcarrier interval is 1, a first and a second UEs are allocated with the 5 MHz transmission bandwidth, a third UE is allocated with the 10 MHz transmission bandwidth, and a fourth UE is allocated with the 20 MHz transmission bandwidth. When the fourth UE transmits the scheduling reference signal, the remaining UEs cannot transmit the scheduling reference signals since the subcarrier interval is 1. Thus, in $T_1$, the first to third UEs transmit the scheduling reference signals, and in $T_{12}$, the fourth UE transmits the scheduling reference signal. That is, the scheduling reference signals are transmitted between the UEs with them undergoing Time Division Multiplexing (hereinafter, referred to as TDM).

Figure 12:
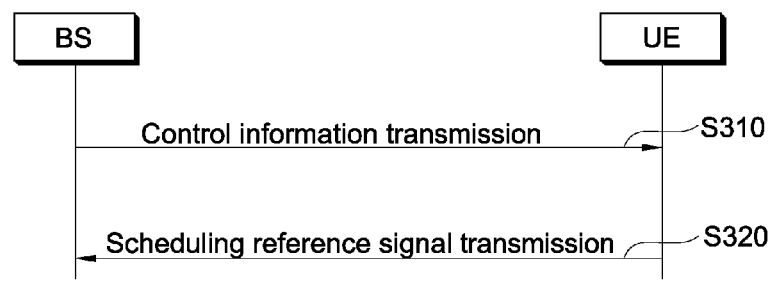
FIG. 12 is a flowchart illustrating a method of transmitting a scheduling reference signal according to the present invention.

FIG. 12 is a flowchart illustrating a method of transmitting a scheduling reference signal.

Referring to FIG. 12, a BS transmits control information to a UE (S310). In general, since the type of the transmission bandwidth and the number of UEs are changed as time goes by, the BS has to transmit adequate control information periodically or if appropriate. The control information can be broadcasted to the entire UEs or transmitted through a dedicated channel.

The control information includes a transmission bandwidth, a subcarrier interval value, a hopping or shift method, a CAZAC sequence allocation method and so on. The term hopping or shift method refers to a method of deciding how to hop respective divided partial SRS transmission bands every transmitting time to transmit the scheduling reference signal. Signaling is possible in an upper layer signaling and also a physical layer signaling.

The UE transmits the scheduling reference signal to a BS (S320). The UE generates a scheduling reference signal using predetermined control information, such as an allocated transmission bandwidth, an allocated subcarrier interval value, a predetermined hopping or shift method, and a CAZAC sequence, and transmits a generated scheduling reference signal to the BS.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a scheduling reference signal (SRS) for uplink scheduling, the method comprising:
    receiving band information and subcarrier information that are used for a partial SRS, the band information indicating a bandwidth and the subcarrier information indicating subcarriers;
    dividing a scheduled full SRS transmission band into N sub-bands;
    generating N partial SRSs, each of the N partial SRSs corresponding to one of the N sub-bands; and
    transmitting the N partial SRSs one-by-one via N sub-frames by using the subcarriers,
    wherein each of the N sub-bands has the indicated bandwidth and none of the N sub-bands is overlapped with any other sub-band,
    wherein N is a natural number greater than 1 and is determined by dividing the full SRS transmission band by the bandwidth,
    wherein each of the N sub-frames comprises a plurality of orthogonal frequency division multiplexing (OFDM) symbols,
    wherein each of the N partial SRSs is transmitted via one of the OFDM symbols,
    wherein the first partial SRSs are generated by cyclically shifting a base sequence by a first cyclic shift (CS) amount,
    wherein the second partial SRSs are generated by cyclically shifting the base sequence by a second CS amount, and
    the first CS amount is different from the second CS amount.

2. The method of claim 1, wherein:
    the full SRS transmission band is 20 MHz; and
    the bandwidth is 5 MHz or 10 MHz.

3. The method of claim 1, wherein the subcarrier information further indicates subcarriers having an even-numbered index or subcarriers having an odd-numbered index.

4. A method of receiving a scheduling reference signal (SRS) for uplink scheduling, the method comprising:
    scheduling a full SRS transmission band for a first user equipment (UE) and a second UE;
    transmitting first band information and first subcarrier information that are used for first partial SRSs, the first band information indicating a first bandwidth and the first subcarrier information indicating first subcarriers;
    transmitting second band information and second subcarrier information that are used for second partial SRSs, the second band information indicating a second bandwidth and the second subcarrier information indicating second subcarriers;
    receiving the first partial SRSs one-by-one via N sub-bands by using the first subcarriers, each of the first partial SRSs corresponding to one of the N sub-bands; and
    receiving the second partial SRSs one-by-one via M sub-bands by using the second subcarriers, each of the second partial SRSs corresponding to one of the M sub-bands,
    wherein each of the N sub-bands has the first bandwidth and none of the N sub-bands is overlapped with any other sub-band,
    wherein each of the M sub-bands has the second bandwidth and none of the M sub-bands is overlapped with any other sub-band,
    wherein N is a natural number greater than 1 and is determined by dividing the full SRS transmission band by the first bandwidth,
    wherein M is a natural number greater than 1 and is determined by dividing the full SRS transmission band by the second bandwidth,
    wherein each of the N sub-frames and M sub-frames comprise a plurality of orthogonal frequency division multiplexing (OFDM) symbols,
    wherein the first partial SRSs and the second partial SRSs are received via an identical OFDM symbol in overlapping sub-frames among the N sub-frames and M sub-frames, wherein the first partial SRSs are generated by cyclically shifting a base sequence by a first cyclic shift (CS) amount, wherein the second partial SRSs are generated by cyclically shifting the base sequence by a second CS amount, and the first CS amount is different from the second CS amount.

5. The method of claim 4, wherein:
the full SRS transmission band is 20 MHz;
the first bandwidth is 5 MHz or 10 MHz; and
the second bandwidth is 5 MHz or 10 MHz.

6. The method of claim 4, wherein:
the first subcarrier information indicates subcarriers having an even-numbered index; and
the second subcarrier information indicates subcarriers having an odd-numbered index.

* * * * *